(12) United States Patent
Collins et al.

(10) Patent No.: US 10,151,428 B2
(45) Date of Patent: Dec. 11, 2018

(54) REDUCING PRESSURE OF COMPRESSED GAS FROM A STORAGE TANK

(71) Applicant: GE Oil & Gas, Inc., Houston, TX (US)

(72) Inventors: Christopher Joseph Collins, Converse, TX (US); Emmanuel G Galindo, San Antonio, TX (US); Daisy Yuen Lau, Houston, TX (US); Anindra Mazumdar, Katy, TX (US); Garrick Gerald Mullen, Schertz, TX (US); Mae Alane Plummer, New Braunfels, TX (US)

(73) Assignee: GE Oil & Gas, LLC, Houston, TX (US)

( * ) Notice: Subject to any disclaimer, the term of this patent is extended or adjusted under 35 U.S.C. 154(b) by 0 days.

(21) Appl. No.: 15/384,567

(22) Filed: Dec. 20, 2016

(65) Prior Publication Data

US 2017/0184251 A1   Jun. 29, 2017

Related U.S. Application Data

(60) Provisional application No. 62/271,237, filed on Dec. 27, 2015.

(51) Int. Cl.
*F17C 5/06*   (2006.01)
*B60P 3/22*   (2006.01)
(Continued)

(52) U.S. Cl.
CPC .............. *F17C 5/06* (2013.01); *B60P 3/2245* (2013.01); *F17C 7/00* (2013.01); *F17C 13/02* (2013.01);
(Continued)

(58) Field of Classification Search
CPC ...... F17C 2250/0626; F17C 2250/0631; F17C 7/00; F17C 7/02; F17C 5/06; F17C 13/02;
(Continued)

(56) References Cited

U.S. PATENT DOCUMENTS 6,105,389 A * 8/2000 Paradowski ........... F25J 1/0022
62/613
6,732,769 B2 * 5/2004 Del Campo ............. A62C 3/00
141/231
(Continued)

FOREIGN PATENT DOCUMENTS

WO   WO 2014031999 A2 *   2/2014   ............... F17C 5/06

OTHER PUBLICATIONS

A WO ISR and Written opinion dated Mar. 10, 2017 for Application No. PCT/US2016/068666.

*Primary Examiner* — Timothy L Maust
*Assistant Examiner* — Andrew Stclair
(74) *Attorney, Agent, or Firm* — GE Global Patent Operation

(57) ABSTRACT

A system that can offload compressed gas from a storage tank to a customer site. The system can have a fluid circuit that is configured to fit within a container structure, like a trailer, for mobility to remote locations. This fluid circuit can include a transfer unit to automatically switch between tanks. The transfer unit can couple with a heat exchanger. Downstream of the heat exchanger, the fluid circuit can reduce pressure of fluid from the tanks through multiple pressure reduction stages. Each of the pressure reduction stages can include a throttling device, for example, a pilot-type fluid regulator and a control valve assembly. The throttling device may be selected to maintain flow of fluid at
(Continued)

least at, e.g., 35,000 scfh, in accordance with pressure drops in the incoming fluid from the tanks.

14 Claims, 9 Drawing Sheets

(51) Int. Cl.
*F17C 7/00* (2006.01)
*F17C 13/02* (2006.01)
*F17C 13/04* (2006.01)

(52) U.S. Cl.
CPC ...... *F17C 13/04* (2013.01); *F17C 2201/0166* (2013.01); *F17C 2205/0323* (2013.01); *F17C 2205/0338* (2013.01); *F17C 2223/035* (2013.01); *F17C 2223/036* (2013.01); *F17C 2225/033* (2013.01); *F17C 2227/00* (2013.01); *F17C 2227/036* (2013.01); *F17C 2227/0309* (2013.01); *F17C 2250/043* (2013.01); *F17C 2250/0439* (2013.01); *F17C 2250/0443* (2013.01); *F17C 2250/0626* (2013.01); *F17C 2250/0631* (2013.01); *F17C 2250/0636* (2013.01); *F17C 2265/068* (2013.01); *F17C 2270/0168* (2013.01)

(58) Field of Classification Search
CPC ............ F17C 2223/035; F17C 2227/00; B60P 3/2245
See application file for complete search history.

(56) References Cited

U.S. PATENT DOCUMENTS

| | | | |
|---|---|---|---|
| 6,786,245 B1* | 9/2004 | Eichelberger | B60S 5/02 141/18 |
| 7,222,647 B2* | 5/2007 | Bingham | F17C 7/02 141/11 |
| 8,613,201 B2 | 12/2013 | Bayliff et al. | |
| 9,046,218 B2 | 6/2015 | Macaluso et al. | |
| 2009/0314384 A1 | 12/2009 | Brakefield et al. | |
| 2011/0056571 A1 | 3/2011 | Bayliff et al. | |
| 2012/0192580 A1* | 8/2012 | Santos | C10L 3/107 62/172 |
| 2016/0097363 A1* | 4/2016 | Murray, Sr. | F17C 13/08 123/2 |
| 2016/0290563 A1* | 10/2016 | Diggins | F17C 7/02 |

\* cited by examiner

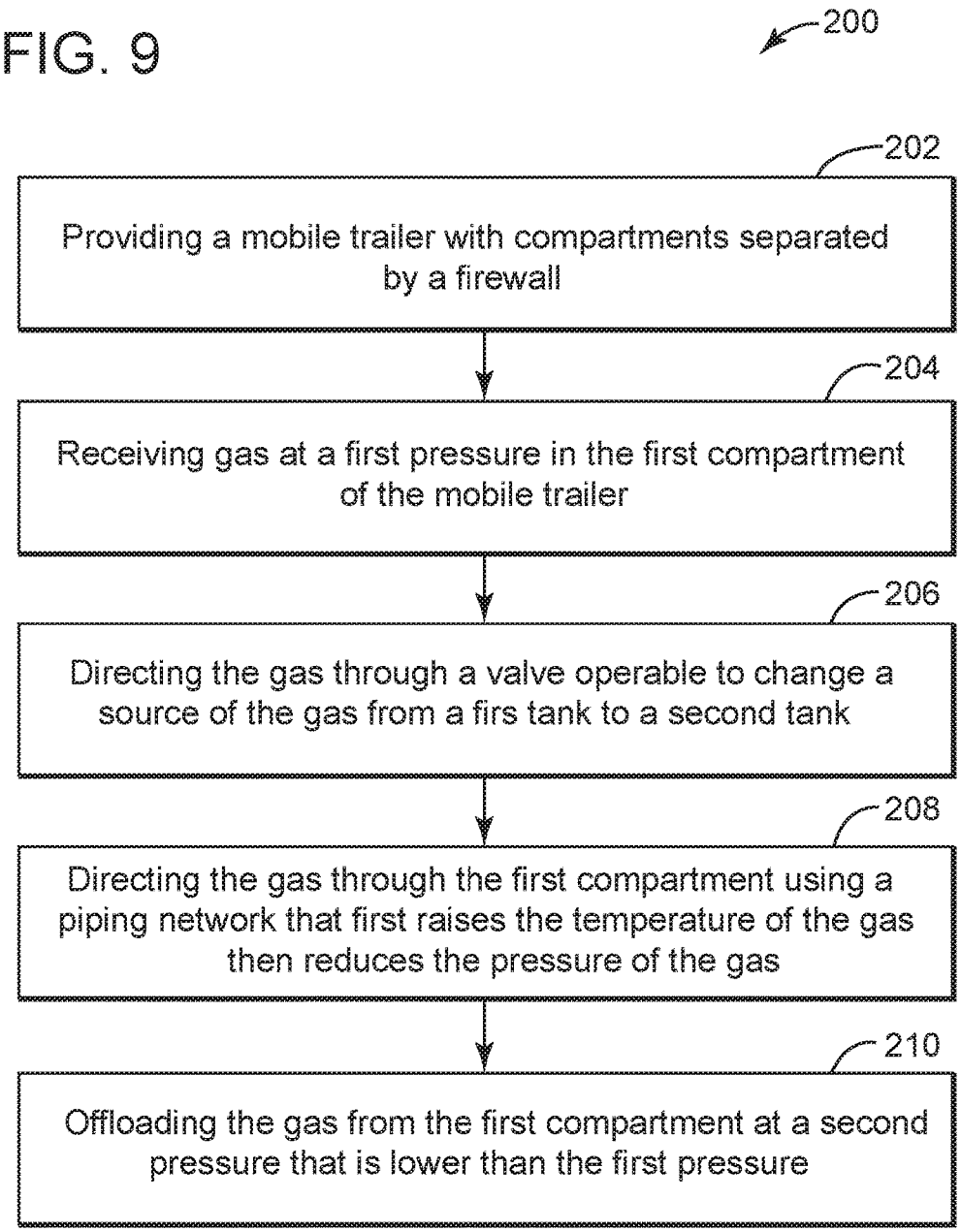

REDUCING PRESSURE OF COMPRESSED GAS FROM A STORAGE TANK

CROSS-REFERENCE TO RELATED APPLICATIONS

This application claims the benefit of priority to U.S. Provisional Patent Application Ser. No. 62/271,237, filed on Dec. 27, 2015, and entitled "REDUCING PRESSURE OF COMPRESSED GAS FROM A STORAGE TANK," the content of which is incorporated herein by reference in its entirety.

BACKGROUND

Delivery of hydrocarbons may utilize tanks that transit by truck, ship, and rail. These tanks can carry large amounts of compressed gas under very high pressure. However, there is often a mismatch between the pressure of the gas during transit and the pressure that the customer requires to unload the compressed gas from the tanks.

SUMMARY

The subject matter of this disclosure relates generally to unloading of compressed gas. The embodiments herein can distribute gas found at "high" pressure in transit tanks (e.g., tube trailers) to customer designated repositories. These repositories are often configured only to receive gas at "low" pressure. As noted more below, some embodiments may integrate components that can satisfy the pressure drop from tank to customer repository. These components may maintain the gas as vapor to avoid two-phase flow that can frustrate accurate and reliable measure of properties (e.g., temperature, pressure, flow, etc.) of fluid that disperses to the customer. The components can also automate operation to allow multiple tanks to empty without intervention by an operator. The components can further permit most, if not all, of the compressed gas in the tanks to offload to the customer.

The components are configured in a way to fit on-board a trailer and/or cargo container. These configurations fully enclose the components. However, the configuration provides sufficient room to access each component in order to perform maintenance and repair onsite, often without the need to take the trailer off the road to a repair facility. Use of the trailer permits the embodiments to transit between locations. This feature is useful, particularly, to deploy the embodiments among remote locations found in harsh climates and with limited access to utilities. In this regard, the components are configured to operate in ambient temperatures down to −40° C. with only natural gas for use as fuel and to operate instrumentation (e.g., control valves), both of which may be unavailable at the remote locations.

BRIEF DESCRIPTION OF THE DRAWINGS

Reference is now made briefly to the accompanying drawings, in which:

FIG. 9 depicts a flow diagram for an exemplary embodiment of a method to offload compressed gas from a tank to a customer site.

Figure 1:
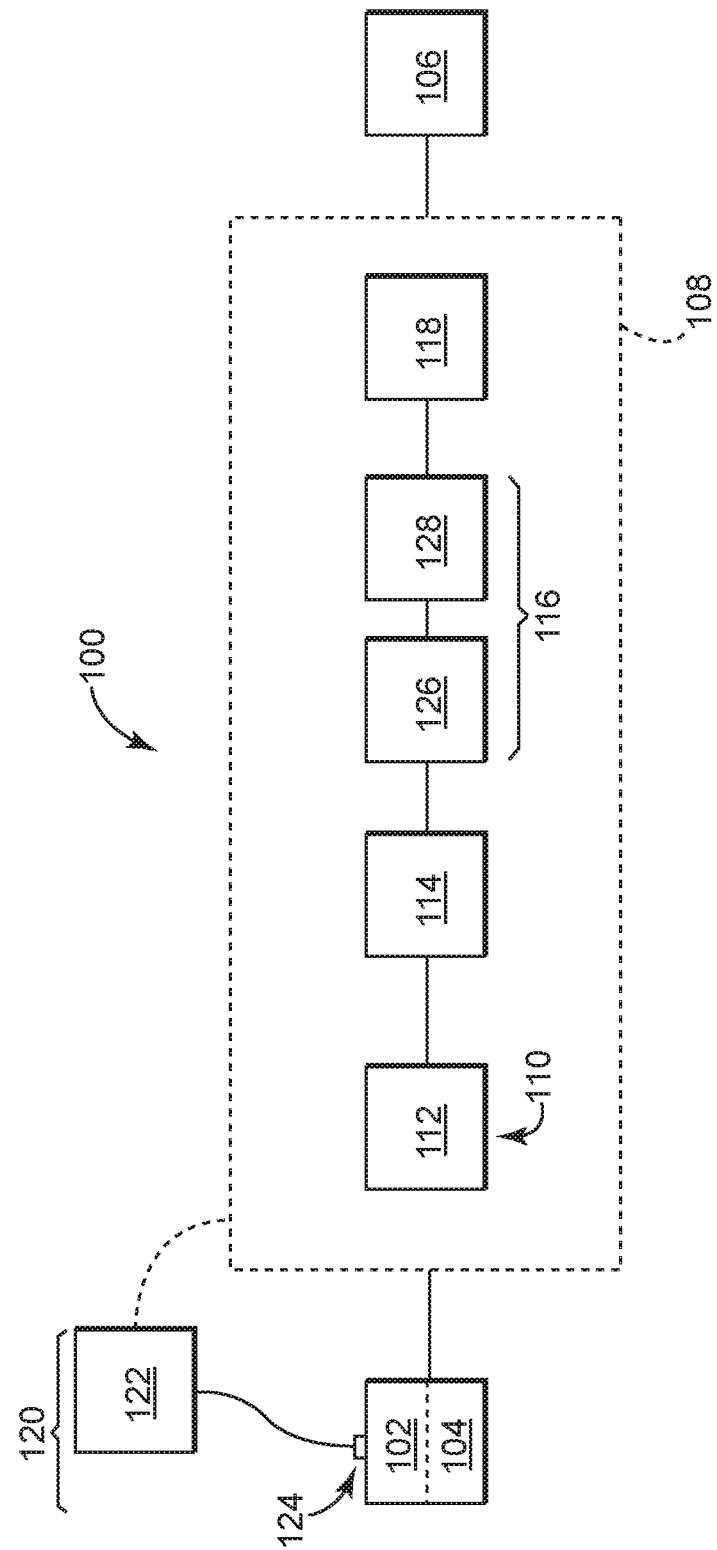
FIG. 1 depicts a schematic diagram of an exemplary embodiment of a system to reduce pressure of fluid found in a tank.

Where applicable like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

DETAILED DESCRIPTION

The discussion below describes embodiments to reduce pressure of compressed fluid. These embodiments are configured to condition the fluid from a pressure of approximately 4000 psig to a pressure of approximately 80 psig. Other embodiments are within the scope of the disclosed subject matter.

FIG. 1 illustrates a schematic diagram of an exemplary embodiment of a system 100 to reduce pressure of a compressed fluid. The embodiment can couple with one or more storage tanks (e.g., a first storage tank 102 and a second storage tank 104). The tanks 102, 104 can hold compressed fluid, typically gas, at a storage pressure that is often at approximately 4,000 psig or less. The system 100 may include a fluid circuit with components that are configured to reduce pressure of the compressed fluid from the storage pressure. This feature can allow the fluid to offload from the tanks 102, 104 to a collateral repository 106 at, for example, a customer site or facility. This collateral repository 106 may embody a holding tank, pipe (or conduit), and/or like receptacle at the customer site that requires the fluid to be at lower pressures relative to the pressure of the fluid in the tanks 102, 104.

The fluid circuit can have a number of components to condition the fluid to a pressure that is appropriate for the collateral repository 106. These components may reside on a platform, shown generally as the phantom box enumerate by the numeral 108. The platform 108 can have a structure that permits the system 100 to transit among different sites and/or facilities. Suitable structures may embody a trailer or a container. These structures can include wheels that ease towing and mobility, whether by train, truck, or like vehicular transportation. Moving from left to right on the platform 108, one implementation of the fluid circuit may include a transfer unit 110 that couples with the tanks 102, 104. The transfer unit 110 may include a valve member 112 to manage flow of fluid from the tanks 102, 104 to downstream components in the fluid circuit. These downstream components may include a temperature conditioning unit 114, a pressure reduction unit 116, and a flow meter 118. Peripherally, the system 100 may couple with a control unit 120 that has a controller 122 and one or more sensors (e.g., a first sensor 124). The controller 122 may couple with at least the valve member 112 and the flow meter 118, as well as with the first sensor 124. In this way, the control unit 120 can operate the components in the fluid circuit in response to variations in operating parameters that may occur as the fluid offloads from the tanks 102, 104.

As noted above, the system 100 is configured to transfer fluid from tanks 102, 104 to the collateral repository 106. These configurations may operate autonomously in lieu of manual operators that would couple the system 100 from one of the tanks 102, 104 to the other. In use, the controller 122 can respond to changes in the operating parameters to select a position (also "state" or "condition") for the valve member 112. The selected position may correspond with the tank 102, 104 that is full and/or that has fluid at levels that is sufficient to offload to the customer. Examples of the first sensor 124 may include devices that are sensitive to pressure, temperature, and fluid flow, among other indicators that might useful to determine the position for the valve member. These devices may couple with tanks 102, 104, as shown. Other implementations may position the first sensor 124 in the fluid circuit at one or more positions downstream of the tanks 102, 104.

The temperature conditioning unit 114 can be configured to raise temperature of fluid from the tanks 102, 104. These configurations may embody a heat exchanger to promote thermal transfer indirectly between fluids. The heat exchanger can reside upstream of the pressure reduction unit 116 and the flow meter 118. In one implementation, the heat exchanger can raise the temperature of the fluid from the tanks 102, 104 from a first temperature to a second temperature that is greater than the first temperature. The change in temperature may be approximately 220° F. or less; for example, in use, the temperature conditioning unit 114 can raise the temperature from approximately −40° F. to approximately 180° F. The second temperature may determine the phase of the fluid. So this disclosure does not foreclose use of a cooler (and like devices) that could cause the second temperature to be lower than the first temperature as well. However, it may be advantageous for the second temperature to maintain the fluid in vapor phase, rather than in liquid phase or mixed phase (e.g., liquid and vapor). This feature can prevent liquid dropouts in the other components of the fluid circuit that are downstream of the heat exchanger.

The pressure reduction unit 116 can be configured to reduce the pressure of the fluid from the tanks 102, 104. These configurations can utilize multiple stages, shown generally in FIG. 1 as a first stage 126 and a second stage 128. In each of the stages 126, 128, the pressure reduction unit 116 may include a throttling device, like a valve and/or valve assembly. These throttling devices can operate in accordance with Joule-Thompson effect to adiabatically expand the fluid.

At the first stage 126, the throttling device may reduce the pressure of the fluid from a first pressure to a second pressure that is lower than the first pressure. This device may cause a pressure drop of at least approximately 3,600 psig or more. In one implementation, the throttling device in the first stage 126 can condition the fluid from approximately 4,000 psig to approximately 400 psig. Exemplary devices for use as in this first stage 126 can include pressure regulators, often of a spring-type or pilot-type. The spring-type pressure regulator may help simplify the design. These types of devices may be compatible with flow at high pressure but lower flow rates (based on their low flow co-efficient (Cv) relative to pilot-type devices). In one implementation, the pilot-type pressure regulator may benefit the system 100 at the first stage 126. These types of regulators may provide more accurate control of the second pressure under flowing conditions. Moreover, the pilot-type design can minimize "droop" and maintain flowrate of fluid in the fluid circuit in response to pressure changes that may result as the tanks 102, 104 empty over time. In one implementation, the pilot-type design can maintain flow rate at approximately 35,000 scfh in response to pressure drop of the fluid in the tanks 102, 104 from an initial pressure of 4000 psig to approximately 200 psig. In one example, the pressure regulator for use in the first stage 126 may have a flow coefficient (Cv) that is in a range of from approximately 4 to approximately 8, with one example at approximately 6.

The second stage 128 may be configured to further reduce the pressure of the fluid that exits the first stage 126. These configurations may use a control valve to drop the pressure from the second pressure to a third pressure that is lower than the second pressure. The control valve may cause the pressure to drop by at least approximately 320 psig or more. In one implementation, the control valve in the second stage 128 can condition the fluid from approximately 400 psig to approximately 80 psig. The third pressure may be in a range of from approximately 50 psig to approximately 100 psig; however, this third pressure may be defined by the customer and/or site facilities.

The flow meter 118 can measure properties of the fluid. Examples of the flow meter may be ultrasonic, although other types of flow meters may suffice for the system 100.

Figure 2:
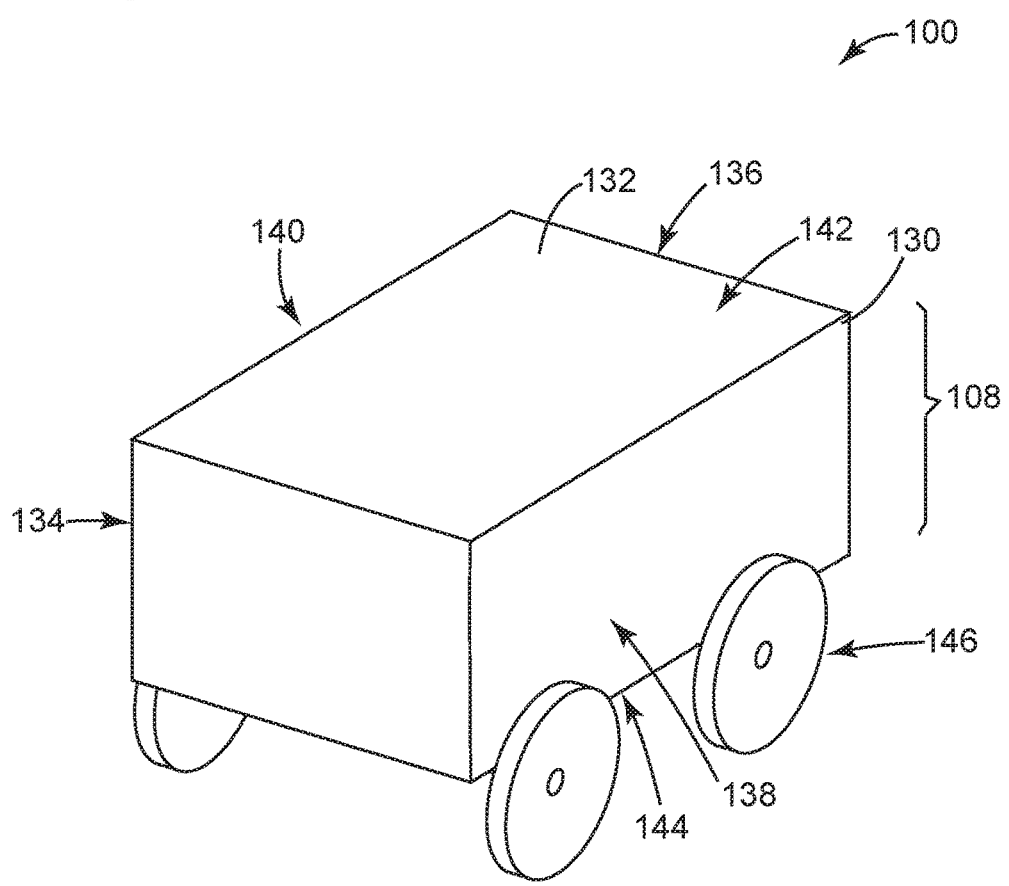
FIG. 2 depicts a perspective view of the front of an exemplary embodiment of a system in assembled form.

FIGS. 2, 3, 4, 5, 6, 7 and 8 illustrate one exemplary construction for the system 100. FIG. 2 depicts a perspective view of the front of the system 100 in assembled form. FIGS. 3, 4, 5, 6, 7, and 7 depicts the system 100 in partially-assembled form.

FIG. 2 depicts an example of the system 100 that is configured to transit among several different locations. The platform 108 can include a container structure 130 with members 132 that form ends (e.g., a first end 134 and a second end 136), sides (e.g., a first side 138 and a second side 140), a top 142, and a bottom 144. Due at least in part to the large size and duty requirements on the platform 108, the members 132 can be made of steel, often as plates that fasten with one another using known and/or after-developed fastening techniques; non-limiting examples of these techniques (at the present writing) include welding and bolting. Collectively, the members 132 form an enclosure that houses the components of the fluid circuit. The enclosure serves to protect the working features of the system 100 from exposure to ambient conditions, which may include excessive temperatures (both cold and warm) as well as precipitation, wind, dust, dirt, and the like. As also shown, wheels 146 may integrate with the enclosure for transit of the container structure 130 over road and/or rail. This feature serves the mobility of the system 100 to provide access to remote locations or over rough, unkempt roads and terrain.

Figure 3:
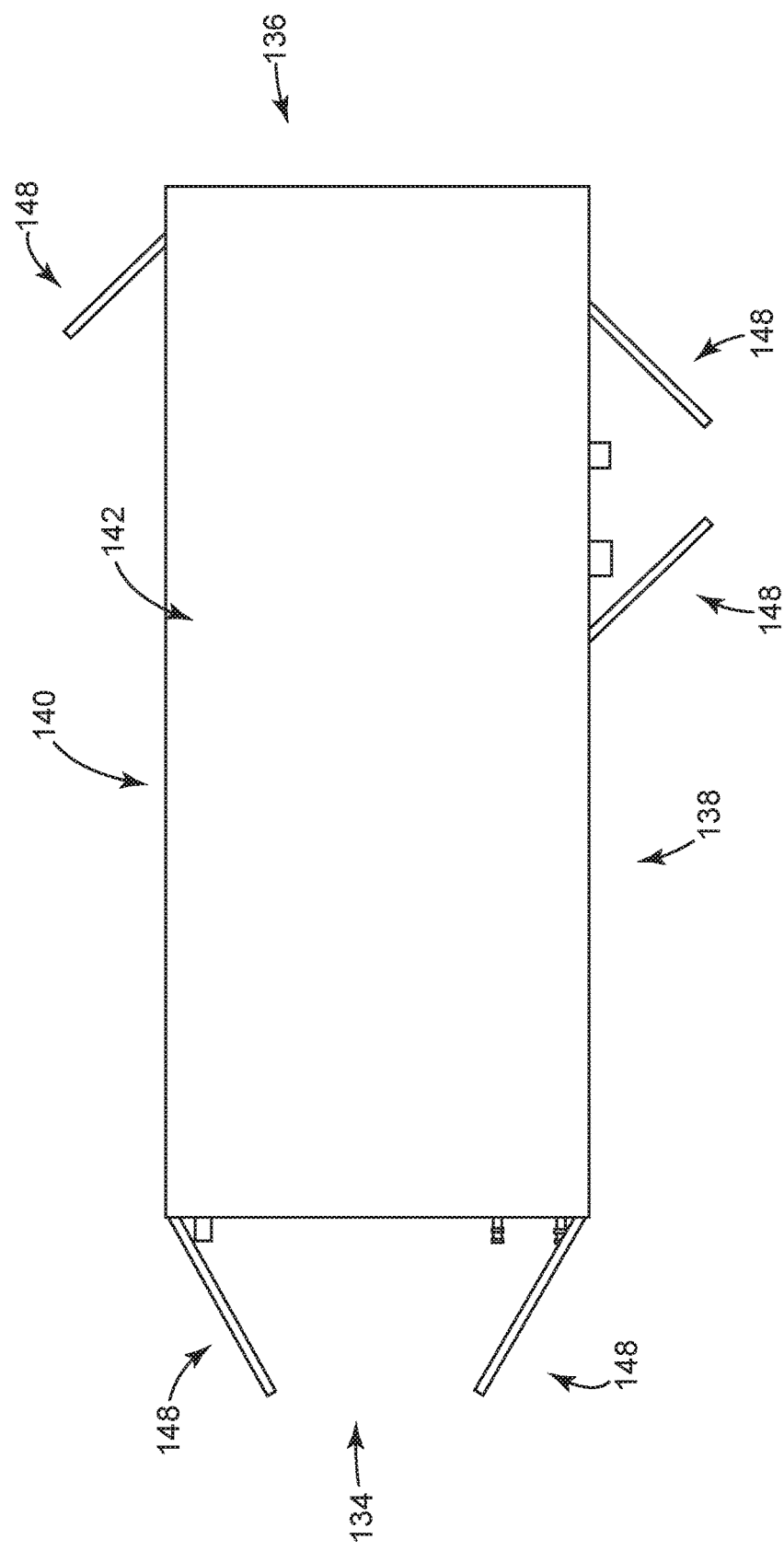
FIG. 3 depicts a plan view of the top of the system of FIG. 2 in assembled form

FIG. 3 provides a top view of the system 100. On the enclosure, the members 132 may form one or more door panels 150 to allow access to the interior of the container structure. The door panels 150 may be disposed in various locations on the structure. Preferably, these locations afford access to different parts of the fluid circuit, as noted more below.

Figure 4:
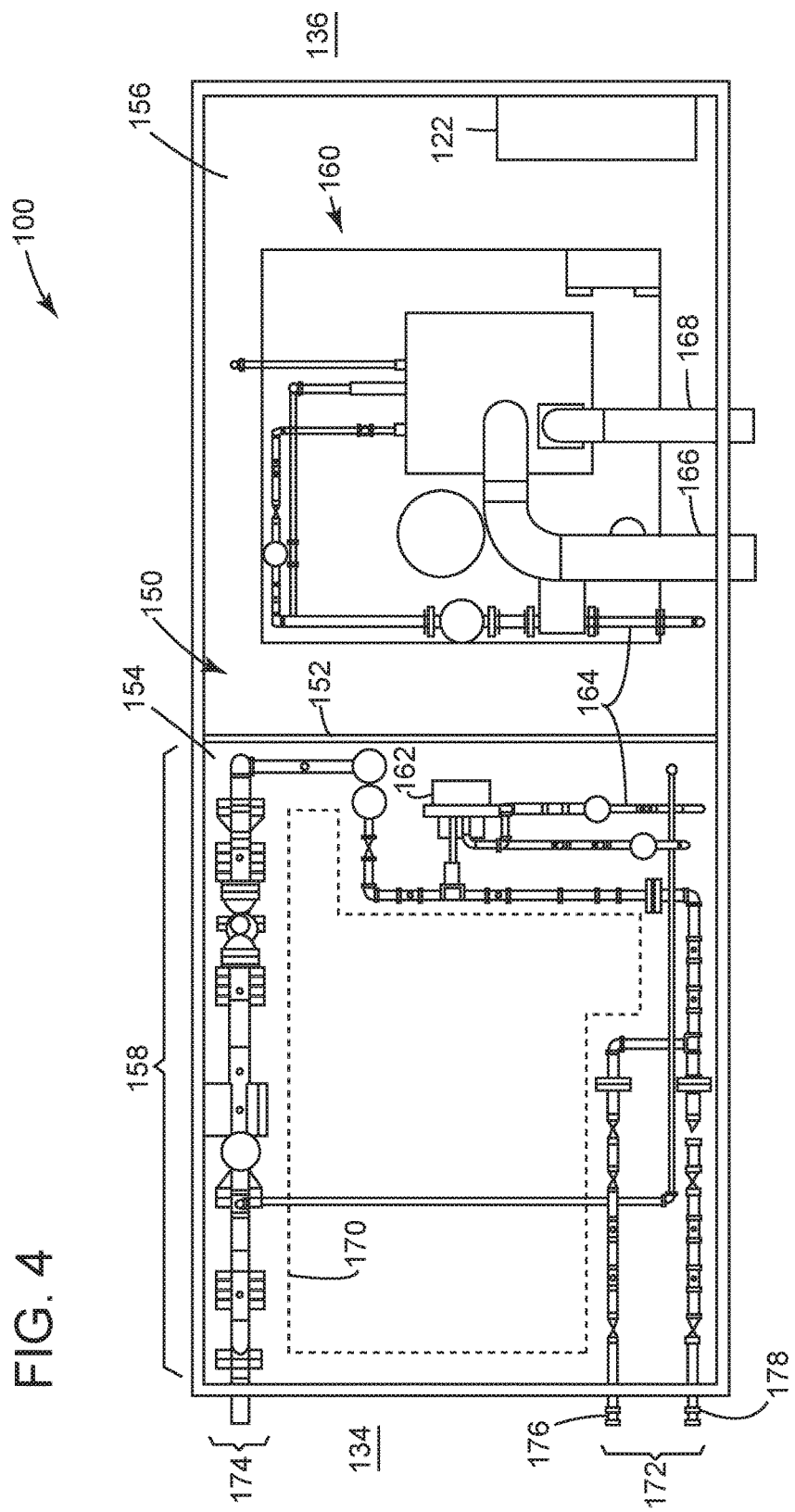
FIG. 4 depicts the system of FIG. 3 in partially-assembled form.

FIG. 4 also illustrates the top view of the system 100. Some parts including the top 142 (FIG. 3) and door panels 148 (FIG. 3) are absent to visualize an exemplary configuration for the inside of the container structure 130. The enclosure has an interior cavity 148. This interior cavity 148 can form a volume that is approximately 3,800 ft$^3$ or, otherwise, in a range from approximately 3,000 ft$^3$ to approximately 4,200 ft$^3$. In one implementation, the container structure 130 may include a bisecting wall 152 that traverses the volume, preferably coupling with the sides 138, 140. The bisecting wall 152 can separates the interior cavity 148 into at least two compartments (e.g., a first compartment 154 and a second compartment 156). Examples of the wall 152 can comprise fire or flame resistant material to operate as a barrier between the compartments 154, 156. As shown, the wall 152 may split the volume equally between the compartments 154, 156, but this does not have to be the case.

The compartments 154, 156 can house components of the fluid circuit. In the first compartment 154, the fluid circuit can have a piping network 158 with pipes, conduits, valves, and like fluid conducting components dispersed throughout. Materials for these components should be suitable to carry the compressed fluid found in tanks 102, 104. The second compartment 156 houses the controller 122 and a heater 160. An exchange network 164 couples the heater 160 with a heat exchanger 162 to circulate heating medium (between the compartments 154, 156). The heater 160 can have an intake 166 and exhaust 168 that may extend out of the interior cavity 150 via door panels 148 (FIG. 3). In one implementation, piping network 158 couples with the heater 160 to disperse compressed gas for use as fuel.

The heater 160 may leverage a variety of constructions. Examples of these constructions may embody electric heaters and thermal fluid heating heaters. Electric heaters afford a simple and efficient design. These devices require no exhaust or venting that would allow fumes or other waste gas and fluids to exit the interior cavity 148 of the enclosure. However, electric heaters need input power (e.g., electricity) to operate, which may be in short supply at the location, if available at all. Thermal fluid heating heaters may make the system 100 more robust to serve a broader range of locations. These types of heaters may include a pump to circulate the heating medium (e.g., glycol, thermal oil, water, etc.) through the tube(s) of the exchange network 164. A boiler may be necessary to raise the temperature of the heating medium as well. The boiler may use fuel (e.g., natural gas) that is available at the facility and/or location of the tanks 102, 104 (FIG. 1). Other configurations for the heater 160 may also be feasible as well.

The heat exchanger 162 may leverage a variety of constructions. Examples of these constructions may embody shell-and-tube designs or spiral tube designs, as desired. As to the former, shell-and-tube devices may comprise a large pressure vessel with bundles of tubes found therein. Fluid flow through the tubes and over the tubes in the shell, effectively promoting indirect heat exchange to occur inside of the device. These types of heat exchanger may be particularly cost prohibitive because these devices often require customization for use in the particular application and, moreover, require extensive length to maximize heat transfer. Spiral or helical tubes ("spiral tube heat exchangers") are useful to address space constraints that might be found on-board the platform 108 and, particularly, inside of the interior cavity 148 of the enclosure. Other configurations for the heat exchanger 162 may also be feasible as well.

The piping network 158 may have components that are disposed proximate the sides 138, 140 and the bisecting wall 152. These components may secure to the members 132. In FIG. 4, the position for the piping network 158 can maximize a maintenance space 170 in the interior cavity 150 to allow ready access to the components of the system 100. At the first end 134, the piping network 158 can have an inlet 172 and an outlet 174, one each to couple with tanks 102, 104 (FIG. 1) and the collateral repository 106 (FIG. 1). The inlet 172 can have a pair of conduits (e.g., a first conduit 176 and a second conduit 178) that couple with the tanks 102, 104, respectively. Hoses might be useful for this purpose. The conduits 176, 178 also couple with the transfer unit 110 (FIG. 1). Actuation of the transfer unit 110 via controller 122 may allow the compressed fluid to flow from tanks 102, 104 into the piping network 158 via at least one of the conduits 176, 178.

Figure 5:
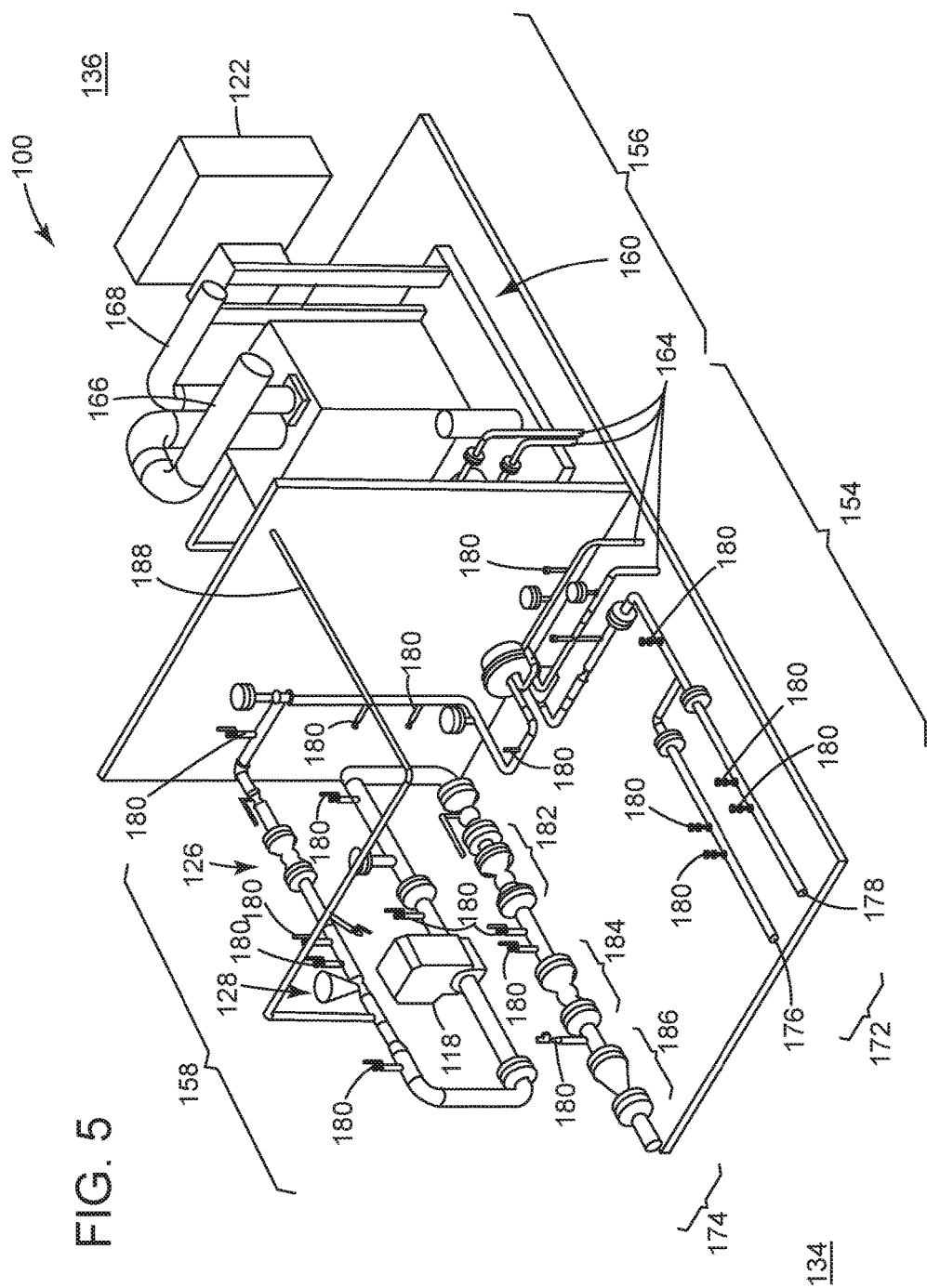
FIG. 5 depicts a perspective view of the front of the system of FIG. 2 in partially-assembled form.
Figure 6:
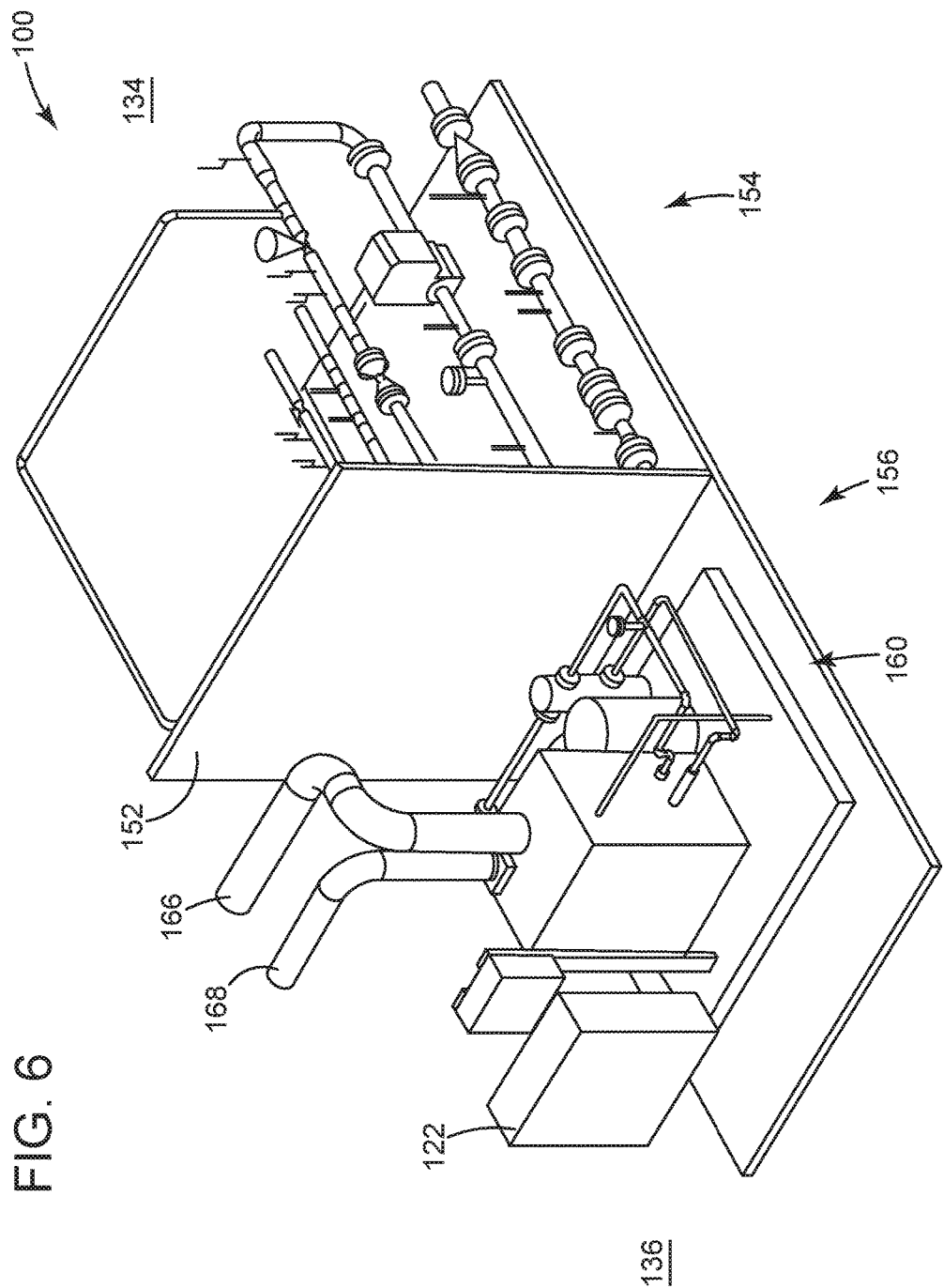
FIG. 6 depicts a perspective view of the back of the system of FIG. 2 in partially-assembled form.

FIGS. 5 and 6 depict a perspective view of the system 100 in partially-exploded form from the front (FIG. 5) and the back (FIG. 6). Parts like some members 132 are removed for clarity. In the first compartment, the piping network 158 may include one or more collateral components that might be useful for certain operative task including maintenance and repair. These collateral components may include one or more taps 180 dispersed variously throughout the conduits. The taps 180 can direct samples of the fluid out of the piping network 158. These samples may be useful for diagnostics and quality control. In one implementation, the collateral components may include one or more isolation valves (e.g., a first isolation valve 182 and a second isolation valve 184) and a check valve 186. The isolation valves 182, 184 can restrict downstream flow, as necessary. The check valve 186 can prevent backflow of fluid from the outlet 174. Further, the piping network 158 may include a bleed-off line 188 to direct fluid as fuel for the heater 160.

As best shown in FIG. 6, the heater 160 fills up a majority of the second compartment 156. The firewall 152 operates as the protective barrier to separate gas that flows in the piping network 158 of the first compartment 154 from any open flame on, for example, the boiler of the heater 160.

Figure 7:
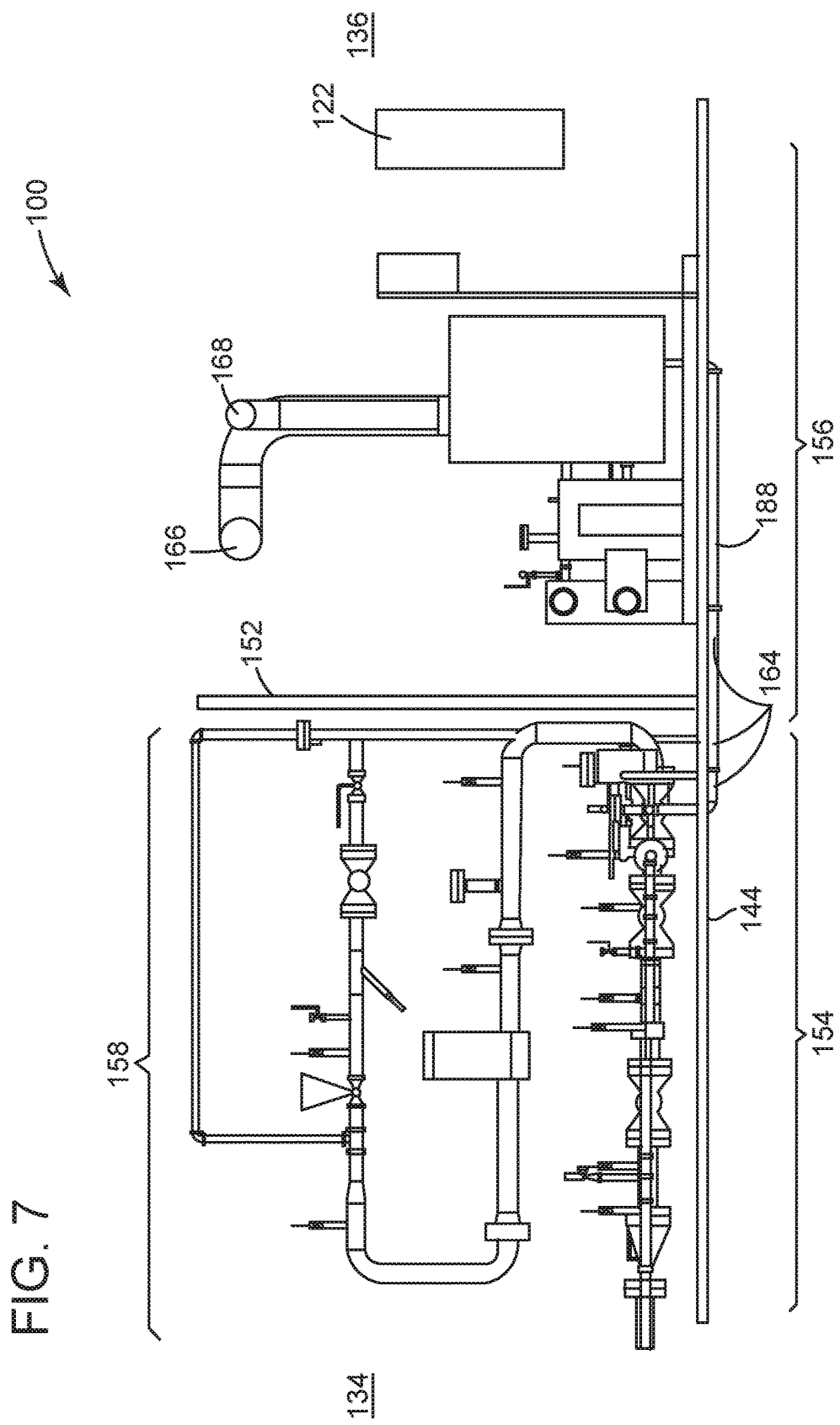
FIG. 7 depicts an elevation view of a first side of the system of FIG. 2 in partially-assembled form.
Figure 8:
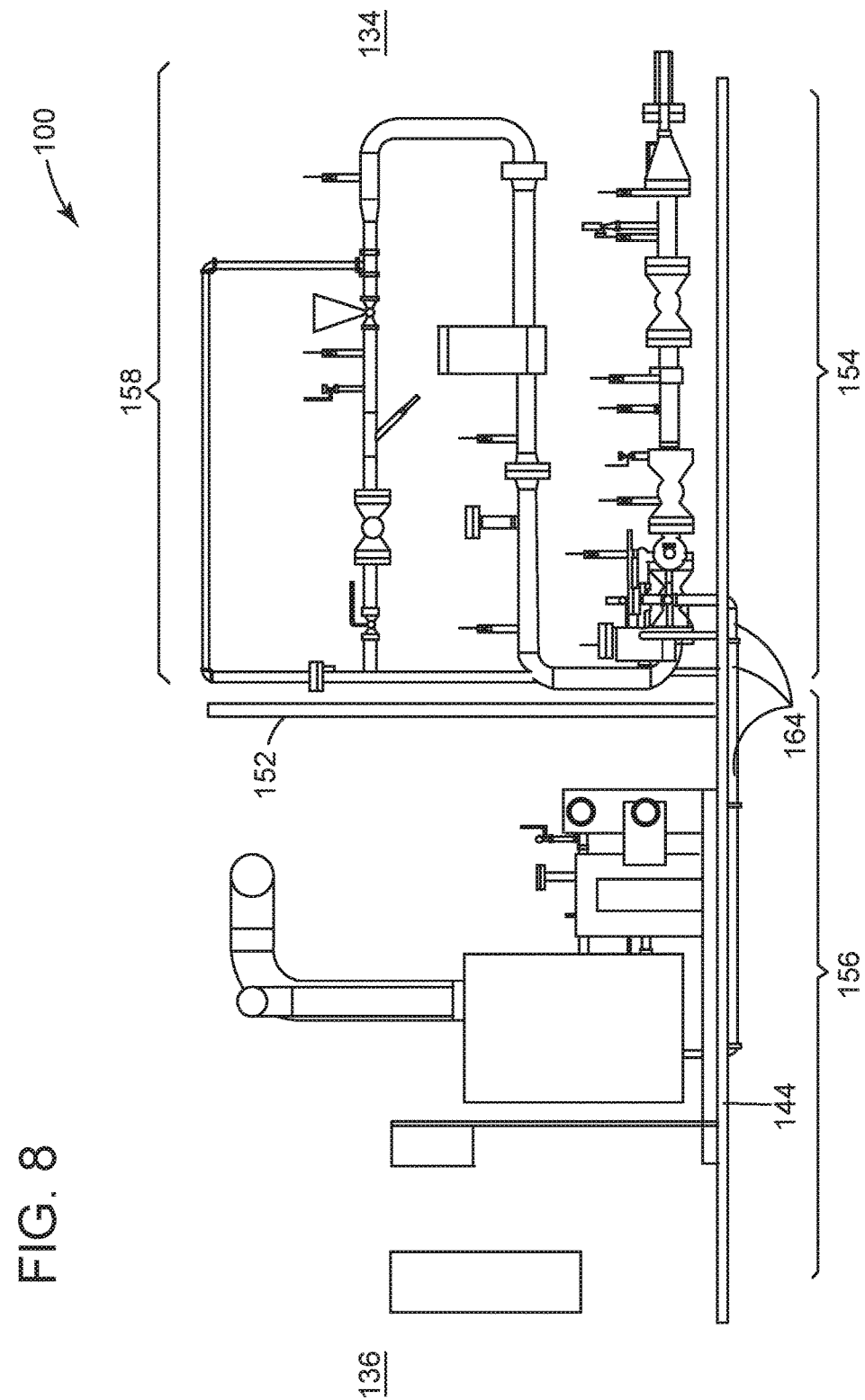
FIG. 8 depicts an elevation view of a second side of the system of FIG. 2 in partially-assembled form.

FIGS. 7 and 8 show an elevation view of the system 100 of FIGS. 5 and 6 from the sides. The exchange network 164 and the bleed-off line 188 may penetrate the bottom 144 of the container structure 130. This configuration can retain the integrity of the bisecting firewall 152 and still allow gas to transit between compartments 154, 156. As noted above, this gas may fire the boiler of the heater 160. This feature can reduce risks of fire, effectively offering protection to individuals working in either compartment 154, 156 from injury.

FIG. 9 illustrates a flow diagram of an exemplary embodiment of a method 200 to transfer compressed has from storage tanks to repositories at reduced pressure. The method 200 can include, at stage 202, providing a mobile trailer with compartments separated by a fire-resistant wall, the compartments comprising a first compartment and a second compartment. The method 200 can also include, at stage 204, receiving gas at a first pressure in the first compartment of the mobile trailer and, at stage 206, directing the gas through a valve operable to change a source of the gas from a first tank to a second tank. The method 200 may further include, at stage 208, directing the gas through the first compartment using a piping network that first raises the temperature of the gas and then reduces the pressure of the gas. The method 200 may include, at stage 210, offloading the gas from the first compartment at a second pressure that is lower than the first pressure.

At stage 202, the method 200 provides the mobile trailer. This mobile trailer may comprises the structure, in whole or in part, as discussed above. This stage may also include stages for transporting the mobile trailer to a location and connecting the mobile trailer to storage tanks at the location.

At stage 204, the method 200 receives the gas at the first compartment. This stage may include one or more additional stages for directing the gas from to one or more storage tanks that hold compressed gas. Preferably, the method 200 may benefit from a pair of storage tanks, or more, because the method 200 can empty one of the tanks and continue to operate on the full tank to offload the gas (at a lower, second pressure) as an end user (e.g., a technician) removes the empty tank.

At stage 206, the method 200 directs the gas through a valve that can change between the two (or more) storage tanks. The method 200 may benefit from "automation," for example, sensors that generate signals in response to a level of the compressed gas in the storage tanks. These signals may transmit data to a controller, which in turn may be configured to regulate the position of the valve in response to the level. In this way, as a first storage tank runs empty, the method 200 can switch over connection of a second storage tank to continue to offload to the repository.

At stage 208, the method 200 directs the gas to increase temperature and reduce pressure. In this regard, the method 200 may include one or more stages for flowing the compressed gas from the storage tanks through a heat exchanger. This stage can raise or maintain the temperature of the fluid above certain critical temperatures for the compressed gas. At this critical temperature, the compressed gas may exhibit a phase composition that is both vapor and liquid. The method 200 may also include one or more stages for, subsequently, flowing the fluid through a first throttling device and flowing the fluid through a second throttling device.

At stage 210, the method 200 may offload the gas from the first compartment at the lower second pressure. This stage may include one or more stages for measuring parameters (e.g. flow rate) of the gas at the second pressure, for example, by flowing the gas through a flow meter or like device. Prior to offloading, the method 200 may benefit from bleeding-off gas from the first compartment to the second compartment to fire a boiler of a heater. This heater is useful to maintain an operating temperature of the heat exchanger, thus increasing the temperature of the gas as noted above.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the embodiments, including the best mode, and also to enable any person skilled in the art to practice the embodiments, including making and using any devices or systems and performing any incorporated methods. The patentable scope of the embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

In light of the foregoing discussion, the embodiments herein offer a mobilized solution to transfer compressed gas from a high pressure storage tank to a lower pressure repository. This mobilized solution leverages structure that may fit onto standard transport and cargo containers for easy transport to remote locations. Onsite, the structure includes a fluid circuit that can couple to more than one storage tank. This fluid circuit can be equipped to offloading procedure, while at the same time leveraging the gas to fire a boiler that heats the compressed gas to maintain its phase as the gas transits the fluid circuit to offload into the repository. In this regard, the examples below include certain elements or clauses one or more of which may be combined with other elements and clauses describe embodiments contemplated within the scope and spirit of this disclosure.

What is claimed is:

1. A system, comprising:
    a container forming an interior cavity, the container comprising a flame resistant wall that separates the interior cavity into a first compartment and a second compartment;
    a fluid circuit disposed in the first compartment, the fluid circuit comprising a heat exchanger and a plurality of pressure reducing stages, each of which include at least one of a valve and a pressure regulator, to reduce pressure of incoming gas, the heat exchanger disposed upstream of the multiple pressure reducing stages;
    a heater disposed in the second compartment and coupled with the fluid circuit to receive gas as a fuel source; and
    a bleed-off line that couples the fluid circuit to the heater, the bleed-off line extending from the first compartment to the second compartment outside of the container.

2. The system of claim 1, further comprising structure to configure the container for mobile transit.

3. The system of claim 1, further comprising a transfer unit coupled with the fluid circuit, the transfer unit having fluid connections to receive incoming gas individually from a pair of tanks.

4. The system of claim 3, further comprising a valve disposed upstream of the heat exchanger and downstream of the transfer unit, the valve having at least two states, one each to allow incoming gas from one of the pair of containers to enter the fluid circuit.

5. The system of claim 1, wherein at least one of the plurality of pressure reducing stages includes a pilot pressure regulator and a control valve assembly.

6. The system of claim 1, wherein the interior cavity has a volume that is at least 3,500 ft$^3$.

7. A mobile trailer, comprising:
    wall members comprising a top, a bottom, ends, and sides of a container structure, the wall members forming an interior cavity;
    a fire-resistant barrier disposed in the interior cavity and coupled with the sides, bottom, and top to separate the interior cavity into a first compartment and a second compartment;
    a fluid circuit disposed in the first compartment, the fluid circuit comprising,
        a valve;
        a heat exchanger downstream of the valve; and
        a pair of throttling devices, each of which include at least one of a valve and valve assembly, downstream of the heat exchanger;
    a heater disposed in the second compartment and coupled with the heat exchanger, the heater comprising a boiler; and
    a bleed-off line coupling the boiler to the fluid circuit, wherein the bleed-off line extends through the bottom of each of the first compartment and the second compartment.

8. The mobile trailer of claim 7, wherein the bleed-off line bypasses the flame resistant wall.

9. The mobile trailer of claim 7, wherein the heat exchanger comprises a spiral tube.

10. The mobile trailer of claim 7, wherein the pair of throttling devices comprises a pilot pressure regulator.

11. The mobile trailer of claim 10, wherein the interior cavity has a volume that is at least 3,500 ft$^3$.

12. The mobile trailer of claim 7, wherein the pair of throttling devices are configured to reduce pressure of gas from 4,000 psig to less than 100 psig at a flow rate of at least 35,000 scfh.

13. A system, comprising:
a container forming an interior cavity, the container comprising a flame resistant wall that separates the interior cavity into a first compartment and a second compartment;
a fluid circuit disposed in the first compartment, the fluid circuit comprising a heat exchanger and a plurality of pressure reducing stages, each of which include at least one of a valve and a pressure regulator, to reduce pressure of incoming gas, the heat exchanger disposed upstream of the multiple pressure reducing stages;
a heater disposed in the second compartment and coupled with the fluid circuit to receive gas as a fuel source; and
a bleed-off line that couples the fluid circuit to the heater, the bleed-off line extending externally from the first compartment to the second compartment around the fire resistant wall.

14. A mobile trailer, comprising:
wall members comprising a top, a bottom, ends, and sides of a container structure, the wall members forming an interior cavity;
a fire-resistant barrier disposed in the interior cavity and coupled with the sides, bottom, and top to separate the interior cavity into a first compartment and a second compartment;
a fluid circuit disposed in the first compartment, the fluid circuit comprising,
a valve;
a heat exchanger downstream of the valve; and
a pair of throttling devices, each of which include at least one of a valve and valve assembly, downstream of the heat exchanger;
a heater disposed in the second compartment and coupled with the heat exchanger, the heater comprising a boiler; and
a bleed-off line coupling the boiler to the fluid circuit, wherein the bleed-off line extends externally from the first compartment to the second compartment around the fire resistant wall.

* * * * *